US011941079B2

(12) United States Patent
Robert et al.

(10) Patent No.: US 11,941,079 B2
(45) Date of Patent: *Mar. 26, 2024

(54) VEHICLE NAVIGATION ASSISTANCE METHOD AND DEVICE USING AN INVARIANT KALMAN FILTER AND A NAVIGATION STATUS OF A SECOND VEHICLE

(71) Applicant: SAFRAN ELECTRONICS & DEFENSE, Boulogne-Billancourt (FR)

(72) Inventors: Emmanuel Robert, Boulogne-Billancourt (FR); Axel Barrau, Boulogne-Billancourt (FR); Thomas Bernal, Boulogne-Billancourt (FR)

(73) Assignee: SAFRAN ELECTRONICS & DEFENSE, Boulogne-Billancourt (FR)

( * ) Notice: Subject to any disclaimer, the term of this patent is extended or adjusted under 35 U.S.C. 154(b) by 569 days.

This patent is subject to a terminal disclaimer.

(21) Appl. No.: 17/262,562

(22) PCT Filed: Jul. 23, 2019

(86) PCT No.: PCT/FR2019/051826
§ 371 (c)(1),
(2) Date: Jan. 22, 2021

(87) PCT Pub. No.: WO2020/021194
PCT Pub. Date: Jan. 30, 2020

(65) Prior Publication Data
US 2021/0295718 A1    Sep. 23, 2021

(30) Foreign Application Priority Data
Jul. 23, 2018   (FR) ...................... 1856802

(51) Int. Cl.
*G06F 18/2113*     (2023.01)
*G01S 19/39*       (2010.01)
(Continued)

(52) U.S. Cl.
CPC ........ *G06F 18/2113* (2023.01); *G01S 19/393* (2019.08); *G01S 19/51* (2013.01);
(Continued)

(58) Field of Classification Search
CPC ........ G06F 18/2113; G06F 7/405; G06F 7/42; G01S 19/393; G01S 19/38; G01S 19/428;
(Continued)

(56) References Cited

PUBLICATIONS

J. Goppert, S. Yantek and I. Hwang, "Invariant Kalman filter application to optical flow based visual odometry for UAVs," 2017 Ninth International Conference on Ubiquitous and Future Networks (ICUFN), Milan, Italy, 2017, pp. 99-104, doi: 10.1109/ICUFN.2017.7993755. (Year: 2017).*

(Continued)

*Primary Examiner* — Geepy Pe
*Assistant Examiner* — Kimia Kohankhaki
(74) *Attorney, Agent, or Firm* — Sughrue Mion, PLLC

(57) ABSTRACT

A method for assisting with the navigation of a fleet of vehicles including a main vehicle and a secondary vehicle that is mobile in relation to the main vehicle, the method including receiving relative movement data, acquired by one or more sensors, between the main vehicle and the secondary vehicle, estimating a navigation status of the fleet of vehicles by an invariant Kalman filter using the received data as observations, the navigation status including first variables representing a first rigid transformation linking a location mark associated with the main vehicle to a reference point, and second variables representing a second rigid transformation linking a location mark associated with the main vehicle to a location mark associated with the second- (Continued)

ary vehicle, the invariant Kalman filter using, as an internal composition law, a law including a term-by term composition of the first rigid transformation and the second rigid transformation.

17 Claims, 2 Drawing Sheets

(51) Int. Cl.
  *G01S 19/51* (2010.01)
  *G01S 19/52* (2010.01)
  *G05D 1/00* (2006.01)
  *G06F 7/40* (2006.01)
  *G06F 7/42* (2006.01)
  *G08G 5/00* (2006.01)
(52) U.S. Cl.
  CPC ............. *G01S 19/52* (2013.01); *G05D 1/101* (2013.01); *G06F 7/405* (2013.01); *G06F 7/42* (2013.01); *G08G 5/0047* (2013.01)

(58) Field of Classification Search
  CPC ........ G01S 19/43; G01S 19/485; G01S 19/51; G01S 19/54; G05D 1/101; G08G 5/0047
  See application file for complete search history.

(56) References Cited

PUBLICATIONS

International Search Report & Written Opinion dated Oct. 14, 2019, issued by the International Searching Authority in application No. PCT/FR2019/051826.
Bezick et al., "Inertial Navigation for Guided Missile Systems", Johns Hopkins APL Technical Digest, 2010, vol. 28, No. 4, pp. 331-342 (12 pages).
Barrau et al., "The Invariant Extended Kalman Filteras a Stable Observer", IEEE Transactions On Automatic Control, Apr. 2017, vol. 62, No. 4, pp. 1797-1812 (16 pages).
Barrau, "Non-linear state error based extended Kalman filters with applications to navigation", MINES Paris Tech, PhD Thesis, Sep. 15, 2015, pp. 1-177 (178 pages).

\* cited by examiner

VEHICLE NAVIGATION ASSISTANCE METHOD AND DEVICE USING AN INVARIANT KALMAN FILTER AND A NAVIGATION STATUS OF A SECOND VEHICLE

CROSS REFERENCE TO RELATED APPLICATIONS

This application is a National Stage of International Application No. PCT/FR2019/051826 filed Jul. 23, 2019, claiming priority based on French Patent Application No. 1856802 filed Jul. 23, 2018, the entire contents of each of which are herein incorporated by reference in their entireties.

FIELD OF THE INVENTION

The present invention concerns a method for assisting the navigation of a carrier using an invariant Kalman fitter.

STATE OF THE ART

The problem of estimating the state of a physical system generally arises as follows. The state of the system at an instant n is represented by a vector $X_n$, and an observation available at the instant n is represented by another vector $Y_n$. The evolution of the system is written:

$$X_{n+1}=f(X_n)$$

where f is a known function (generally called propagation function), which may depend on measurements from sensors. The observations $Y_n$ are related to the state of the system by a known observation function h:

$$Y_n=h(X_n)$$

Building a good estimation $\hat{X}_n$ of the state $X_n$ from the sequence $(Y_n)_{n\geq 0}$ is generally a difficult problem, which can nevertheless be simplified in some cases.

"Linear systems" refer to the particular case of the systems with the form:

$$X_{n+1}=FX_n+w_n$$

$$Y_n=HX_n+V_n$$

where F is a propagation matrix, H is an observation matrix, $w_n$ and $V_n$ are noises that disturb the predictions and the measurements.

In this linear case, a known method consists in building an estimator referred to as "Kalman filter". This Kalman filter implements the following calculations:

$$\hat{X}_{n+1|n}=F\hat{X}_{n|n}$$

$$\hat{X}_{n+1|n+1}=\hat{X}_{n+1|n}+K_{n+1}(Y_{n+1}-H\hat{X}_{n+1|n})$$

where the indices n+1|n and n+1|n+1 respectively designate the estimation calculated at the instant n+1 without taking into account the observation $Y_{n+1}$ and at the instant n+1 by taking into account the observation $Y_{n+1}$. The matrix $K_n$ is called "gain matrix", it can be calculated using a Riccati equation. The estimation error is then defined as:

$$e_{n|n}=X_n-\hat{X}_{n|n} \text{ (after taking into account the observation } Y_n\text{)}$$

$$e_{n+1|n}=X_{n+1}-\hat{X}_{n+1|n} \text{ (before taking into account the observation } Y_{n+1}\text{)}$$

It is possible to easily verify that this error follows the following evolution:

$$e_{n+1|n}=Fe_{n|n} \text{ (before taking into account the observation } Y_{n+1}\text{)}$$

$$e_{n+1|n+1}=(I-K_{n+1}H)e_{n+1|n} \text{ (after taking into account the observation } Y_{n+1}\text{)}$$

where I designates the identity matrix.

The equations above do not depend on $X_n$, it is therefore possible to build an estimator that works for any actual trajectory of the system, which is not the case for any non-Linear system.

In the case of a non-linear system, an ordinary Kalman filter cannot be implemented. Thus, there has been proposed a variant of the Kalman filter called "extended" Kalman filter, which is adapted to a non-linear system. However, when an extended Kalman filter is used, the simplifications observed in the linear case no longer occur, so that an error equation involving $X_n$ and $\hat{X}_n$ is obtained. This problem is at the origin of most of the divergence encountered when using an extended Kalman Nevertheless, a second particular case making the estimation problem easier is the case of the "affine group" observation systems, that is to say the systems for which there is a binary operation (i.e. an operation which will be noted in the following by a star *) defined on the space of the state considered and such that the two following properties are verified:

a. The propagation function f verifies for any pair a, b of elements of the state space the relation:

$$f(a*b)=f(a)*f(Id)^{-1}*f(b)$$

where Id is the identity element of the group induced by the operation *.

b. The observation function h has the form $h(X)=l(x, y_0)$, with $y_0$ an element of the space of the observations (to which the $Y_n$s belong) and l(.,.) a group action, i.e. a function verifying $$l(a*b,y)=l(a,l(b,y))$$

Under these two conditions, it is possible to define an extended Kalman filter called "invariant" (generally more simply called "invariant Kalman filter") which is governed by the following equations:

$$\hat{X}_{n+1|n}=f(\hat{X}_{n|n})$$

$$\hat{X}_{n+1|n+1}=\hat{X}_{n+1|n}*\exp(K_n[l(\hat{X}_{n+1|n}^{-1},Y_{n+1})-l(Id,y_0)])$$

where exp(•) is the exponential map (this function is known as soon as the binary operation is known, if it defines a Lie group) and $K_n$ is a "gain matrix" as in the linear case. It is then possible to show that the estimation error will also have an autonomous evolution, as in the linear case. The problem of estimating the state is therefore simplified, even if the system considered is not linear.

When condition b. is not verified, it is possible to use a filter with the form $$\hat{X}_{n+1|n}=f(\hat{X}_{n|n})$$

$$\hat{X}_{n+1|n+1}=\hat{X}_{n+1|n}*\exp(K_n[Y_{n+1}-h(\hat{X}_{n+1|n})])$$

In practice, a Kalman filter is generally implemented on a system that does not satisfy the condition a., but that approximates a system that does satisfy this condition a.

Invariant Kalman filters have thus been used in the carrier navigation assistance. An invariant Kalman filter used in such navigation assistance context estimates a navigation state representative of a movement of the considered carrier.

The use of an invariant Kalman filter requires finding a binary operation * for which the conditions a. and b. are verified or nearly verified in order to make the estimation problem easier. There is no generic method for finding such an operation, and various publications have been aimed to provide the correct operation for particular systems. As examples:

a) The operation to be used for an attitude and velocity estimation problem is described in the following document: Bonnabel, S., Martin, P., & Salaün, E. (2009). Invariant Extended Kalman Filter: theory and application to a velocity-aided attitude estimation problem. In Decision and Control, 2009 held jointly with the 2009 28th Chinese Control Conference, CDC/CCC 2009. Proceedings of the 48th IEEE Conference on (pp. 1297-1304). IEEE.

b) The operation to be used for an inertial navigation with estimation of the attitude, velocity and position is described in the following document: Barrau, A., & Bonnabel, S. (2017). The invariant extended Kalman filter as a stable observer. IEEE Transactions on Automatic Control, 62(4), 1797-1812.

c) The operation to be used for the SLAM (Simultaneous Localization And Mapping), That is to say, a navigation using fixed reference points from the carrier's environment, is described in document Barrau, A., & Bonnabel, S. (2015). An EKF-SLAM algorithm with consistency properties. arXiv preprint arXiv:1510.06263.

d) A list of practical systems for which an operation is known is further described in document Barrau, A., & Bonnabel, S. (2017). Linear observation systems on groups (I).

In each of these applications, proprioceptive sensors of a carrier anti an invariant Kalman filter are used to estimate the state of navigation of this carrier.

These applications are of two types. Some of them use kinematic data expressed in a reference frame in which the carrier is movable. However, these kinematic data are not always available. The other applications do not use such kinematic data, but, on the other hand, do not allow estimating a state of navigation of the carrier in the reference frame; these applications can only produce navigation states relating to an initial situation.

DISCLOSURE OF THE INVENTION

An aim of the invention is to overcome the above mentioned drawbacks.

There is therefore proposed, according to a first aspect of the invention, a method for assisting the navigation of a first carrier stationary relative to a second carrier itself movable in a reference frame, the method comprising the following steps implemented by the first carrier:

receiving a navigation state in the reference frame of the second carrier provided by the second carrier, acquiring movement data of the first carrier by at least one proprioceptive sensor of the first carrier, estimating a navigation state of the first carrier by an invariant Kalman filter using the navigation state of the second carrier as observation data, in which the navigation state of the first carrier comprises:

first variables representative of a first rigid transformation linking a frame attached to the first carrier to the reference frame, and second variables representative of a second rigid transformation linking a frame attached to the second carrier to the frame attached to the first carrier, and in which the invariant Kalman filter uses as binary operation an operation comprising a term-by-term composition of the first rigid transformation and of the second rigid transformation.

The proposed method advantageously exploits the fact that the first carrier is stationary relative to a second carrier whose estimated navigation state is already known, constituting an information of absolute nature, that is to say relative to the reference frame in which the second carrier is movable.

This method has the advantage of working even if the first carrier does not know its position relative to the second carrier (in other words when the first carrier and the second carrier are not harmonized).

It also turns out that the binary operation used in this method allows approximating the conditions a. and b. set out in the introduction. The calculations implemented by the invariant Kalman filter are therefore particularly simple to implement.

The method according to the first aspect of the invention may further comprise the following optional features, taken alone or in combination when technically possible.

Preferably, the first variables comprise a rotation matrix representing an attitude of the first carrier, and the second variables comprise a rotation matrix representing the attitude of the second carrier relative to the first carrier.

Preferably, the first variables comprise a position vector of the first carrier, and the second variables comprise a position vector of the second carrier relative to the first carrier.

Preferably, the estimated navigation state of the first carrier further comprises a velocity vector of the first carrier in the reference frame.

Preferably, the binary operation applies identical transformations to one of the position vectors and to the velocity vector.

Preferably, the navigation state of the second carrier received comprises a position vector of the second carrier in the reference frame and a rotation matrix representing an attitude of the second carrier in the reference frame.

Preferably, the invariant Kalman filter uses an innovation comprising a vector $Z^x$ with the form:

$$Z^x = \log(\hat{T}_1^{-1} \circ Y \circ \hat{T}_{21})$$

where:
$\hat{T}_1$ is an estimate of the first variables,
$\hat{T}_{21}$ is an estimate of the second variables, in which the second rigid transformation allows switching from the first frame to the second frame,
Y designates the observation data used by the invariant Kalman filter,
∘ designates a composition,
log(•) designates a logarithm map of a Lie group.

Preferably, the navigation state of the second carrier received comprises a velocity vector of the second carrier in the reference frame and a rotation matrix representing an attitude of the second carrier in the reference frame, the movement data of the first carrier, acquired by the proprioceptive sensor, comprise an angular velocity of the first carrier.

Preferably, the first variables comprise a rotation matrix representing an attitude of the first carrier, and the second variables comprise a rotation matrix representing the attitude of the second carrier relative to the first carrier, and the invariant Kalman filter uses an innovation comprising a vector $Z^v$ with the form:

$$Z^v = \log((\hat{R}_1^T R_2 \hat{R}_{21}, \; \hat{R}_1^T(v_2 - \hat{v}_1) + \hat{R}_1^T R_2(\omega \times \hat{x}_{21})))$$

where:
- $R_1$ is an estimate of the rotation matrix representing an attitude of the first carrier.
- $\hat{R}_{21}$ is an estimate of the rotation matrix representing the attitude of the second carrier relative to the first carrier,
- $\hat{x}_{21}$ is an estimate of a translation vector defining the second rigid transformation,
- $R_2$ is the rotation matrix representing an attitude of the second carrier in the reference frame,
- $v_2$ is the velocity vector of the second carrier in the reference frame,
- $\omega$ is the angular velocity of the first carrier,
- $\times$ designates a vector product,
- $\log(\bullet)$ designates a logarithm map of the Lie group $SE(3)$.

Preferably, the vector $Z^v$ consists of a first vector $Z_R^v$ of size 3 representative of a rotation, and of a second vector $Z_v^v$ of size 3 as well, and in which the invariant Kalman filter uses an innovation Z with the form:

$$Z = \begin{pmatrix} Z^x \\ Z_v^y \end{pmatrix}$$

Preferably, the estimated navigation state of the first carrier further comprises at least one error state specific to the proprioceptive sensor, and the binary operation is additive for this error variable specific to the proprioceptive sensor.

Preferably, the first carrier is an aircraft and the second carrier is an aircraft-carrier, or the first carrier is a projectile and the second carrier is an aircraft that carries the projectile, or the first carrier is an inertial unit of a vehicle and the second carrier is an exteroceptive sensor of the vehicle.

Preferably, the estimation step is implemented in parallel by several invariant Kalman filters, so as to obtain several estimates of the navigation state of the first carrier, and furthermore comprises steps of:
- for each estimate, determining a likelihood metric of the estimate,
- producing a consolidated estimate of the navigation state of the first carrier based on the estimates and their associated likelihood metrics.

It is also proposed, according to a second aspect of the invention, a device for assisting the navigation of a first carrier stationary relative to a second carrier itself movable in a reference frame, the device comprising:
- at least one proprioceptive sensor configured to acquire movement data of the first carrier,
- a communication interface for receiving a navigation state from the second carrier provided by the second carrier,
- an invariant Kalman filter configured to estimate a navigation state of the first carrier by using the navigation state of the second carrier as observation data, in which the navigation state comprises:
  - first variables representative of a first rigid transformation linking a frame attached to the first carrier to the reference frame, and
  - second variables representative of a second rigid transformation linking a frame attached to the second carrier to the frame attached to the first carrier, and
- and in which the invariant Kalman filter uses as binary operation an operation comprising a term-by-term composition of the first rigid transformation and of the second rigid transformation.

DESCRIPTION OF THE FIGURES

Other characteristics, aims and advantages of the invention will emerge from the following description, which is purely illustrative and not restrictive, and which should be read in relation to the appended drawings in which.

In all the figures, similar elements bear identical references.

DETAILED DESCRIPTION OF THE INVENTION

1/Description of the System

Figure 1:
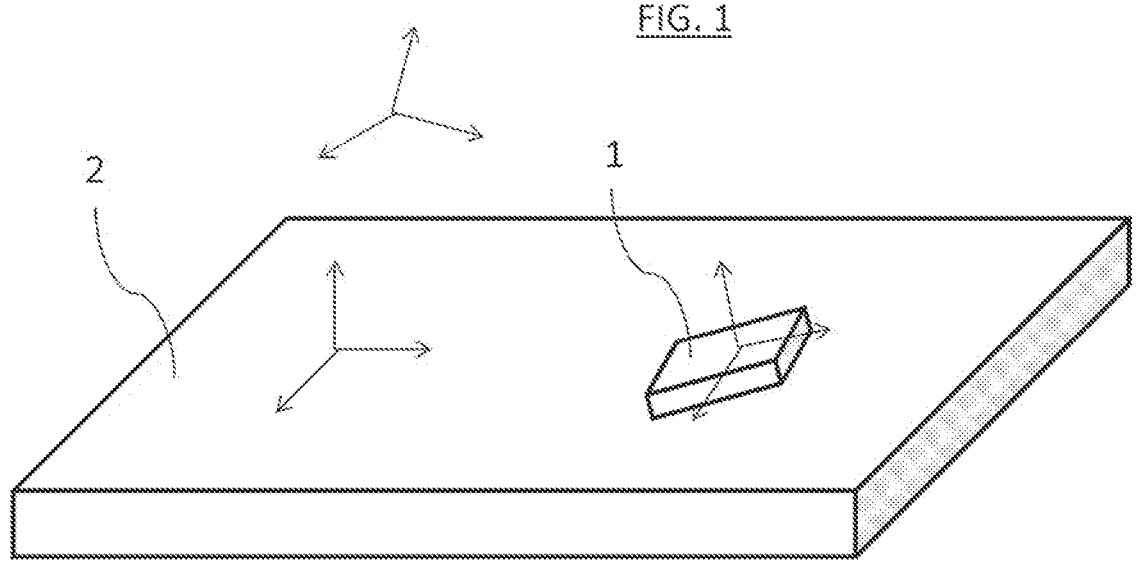
FIG. 1 schematically illustrates two carriers and references.

Referring to FIG. 1, a system comprises a first carrier 1 and at least one second carrier 2 stationary relative to the first carrier 1.

In the following, different references are considered: a first frame attached to the first carrier 1, a second frame attached to the second carrier 2, and a reference frame in which the two carriers 1, 2 are movable. The reference frame is for example a celestial frame attached to stars or to the earth.

In FIG. 1, the second carrier is schematically represented by a parallelepiped, and the first carrier by an object of smaller dimensions placed on the first carrier. This representation is however only schematic and the two carriers can be of various types.

In one embodiment, the first carrier is an aircraft, for example an airplane or a helicopter, and the second carrier is an aircraft carrier, for example a ship of the airplane carrier type on which the airplane is placed.

In another embodiment, the first carrier is a projectile, for example a missile, and the second carrier is an aircraft which carries the projectile, for example an airplane or a helicopter.

In another embodiment, the first carrier is an inertial unit of a vehicle, for example land vehicle, and the second carrier is an exteroceptive sensor of the same vehicle.

Figure 2:
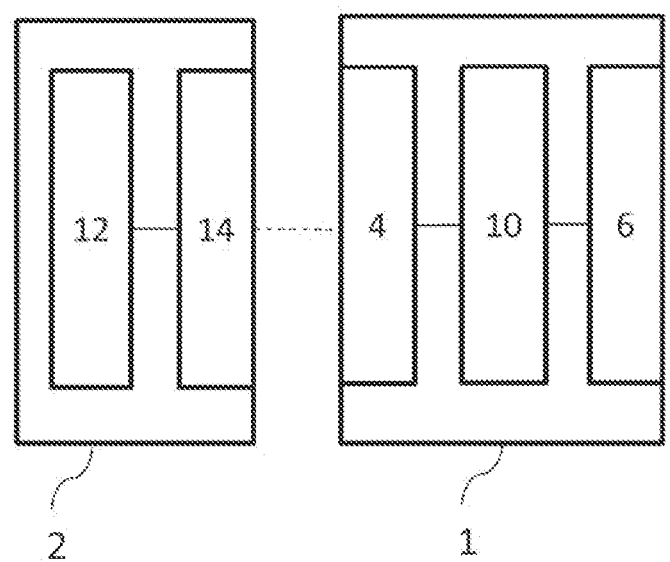
FIG. 2 schematically illustrates internal components of the carriers of FIG. 1, according to one embodiment of the invention.

Referring to FIG. 2, the first carrier 1 comprises a data communication interface with the second carrier 2. The communication interface 4 is of the wireless radio type (Wi-Fi®, Bluetooth®) and for example comprises an antenna. As a variant, this interface is wired.

The first carrier 1 comprises at least one proprioceptive sensor 6. Each proprioceptive sensor used is configured to acquire movement data of the first carrier in the first frame. These data typically comprise angular velocities, and accelerations.

The proprioceptive sensor comprises for example an inertial unit which comprises a plurality of inertial sensors such as pyrometers and accelerometers.

As a variant or in addition, the proprioceptive sensor comprises at least one odometer.

The first carrier 1 furthermore comprises a data processing unit 10. The processing unit 10 is arranged to process data received by the communication interface 4.

The data processing unit 10 typically comprises at least one processor configured to implement a navigation assistance method which will be described below, by means of an invariant Kalman filter. The invariant Kalman filter is typically in the form of a computer program executable by the processor of the data processing unit. The general operation of an invariant Kalman filter is known per se. However, it will be seen below that the binary operation used to configure the invariant Kalman filter implemented by processing unit 10 is chosen in a particular manner.

Preferably, the processing unit 10 is adapted to implement several Kalman filters in parallel.

Furthermore, the second carrier 2 comprises means for estimating a navigation state of this second carrier in the reference frame. These means are known per se. it will for example be possible to use the means described in the document entitled "Aided navigation: GPS with high rate sensors" par Jay Farell, published in 2008.

The second carrier 2 further comprises a communication interface with the first carrier 1, of the same type as the communication interface X.

2/Configuration of the Invariant Kalman Filter

The invariant Kalman filter implemented by the processing unit 10 is configured to estimate a navigation state of the first carrier 1 in the reference frame.

The navigation state of the first carrier comprises first variables representative of a first rigid transformation linking the first frame (attached to the first carrier 1) to the reference frame, and second variables representative of a second rigid transformation linking the second frame (attached to the second carrier 2) to the first frame.

In a well-known manner, a rigid transformation (also known as affine isometry), is a transformation that preserves the distances between pair of points of a solid. Thus, each of the first and second rigid transformations can be characterized by the composition of a rotation and a translation.

In the following, an embodiment will be detailed in which the navigation state of the first carrier, denoted $X_1$, comprises the following elements:

$$X_1 = (R_1, v_1, x_1, R_{23}, x_{21})$$

where:
- $R_1$ is a rotation matrix representing the attitude of the first carrier in the reference frame (rotation component of the transformation which allows switching from coordinates of a point in the first frame to coordinates of the same carrier point in the reference frame),
- $v_1$ is a velocity vector representing the velocity of the first carrier in the reference frame,
- $x_1$ is a position vector representing the position of the first carrier in the reference frame (it is the translation component of the transformation, which allows switching from coordinates of a point in the first frame to coordinates of the same point in the reference frame),
- $R_{21}$ is a rotation matrix representing a relative attitude between the first frame and the second frame. As an example, here is a matrix which allows switching from the first frame (attached to the first carrier 1) to the second frame (attached to the second carrier 2), the reverse being perfectly possible.
- $x_{21}$ is a lever arm between the first carrier 1 and the second carrier 2. It is a translation vector allowing switching from the coordinates of a point in the first frame to the coordinates of the same point in the second frame.

In this particular embodiment, the first variables are $R_1$, $x_1$ and $v_1$; and the second variables are $R_{21}$, $x_{21}$.

In the following, it is considered that the first rigid transformation is $T_1 = (R_1, x_1)$, and that the second rigid transformation is $T_{21} = (R_{21}, x_{21})$.

The invariant Kalman filter is further configured to use as observation data a navigation state $X_2$ of the second carrier 2, expressed in the reference frame.

The navigation state of the second carrier 2 typically comprises
- a rotation matrix $R_2$ representing the attitude of the second carrier in the reference frame (rotation component of the rigid transformation which allows switching from coordinates of a point in the second frame to coordinates of the same carrier point in the reference frame),
- $x_2$ a position vector representing the position of the second carrier in the reference frame (it is the translation component of the rigid transformation, which allows switching from coordinates of a point in the second frame to coordinates of the same carrier point in the reference frame).

It can be envisaged to include a velocity vector $v_2$ representing the velocity of the second carrier in the reference frame, in this state. However, it will be considered in the following that this state does not comprise such a velocity.

The observation of the invariant Kalman filter is then written $$Y = T_2 = (R_2, x_2)$$

The invariant Kalman filter is configured to use as binary operation, denoted *, a term-by-term composition of the first rigid transformation and of the second rigid transformation.

This composition operation can he extended to the velocity vector of the first carrier, when the latter is also comprised in the navigation state of the first carrier. In this case, the binary operation * applies identical transformations to one of the position vectors and to the velocity vector.

The binary operation is applied to states $(R_1, v_1, x_1, R_{21}, x_{21})$ and $(R'_1, v, x'_1, R'_{21}, x'_{21})$ in the following manner:

$$(R_1,v_1,x_1,R_{21},x_{21}) * (R'_1,v'_1,x'_1,R'_{21},x'_{21}) = (R_1 R'_1, v_1 + R_1 v'_1, x_1 + R_1 x'_1, R_{21} R'_{21}, x_{21} + R_{21} x'_{21})$$

It is considered here that the second term and the third term of the product of the binary operation * are of the same form due to the fact that the positions and the velocities are processed by this operation in the same manner.

3/Method for Assisting the Navigation of the First Carrier

Figure 3:
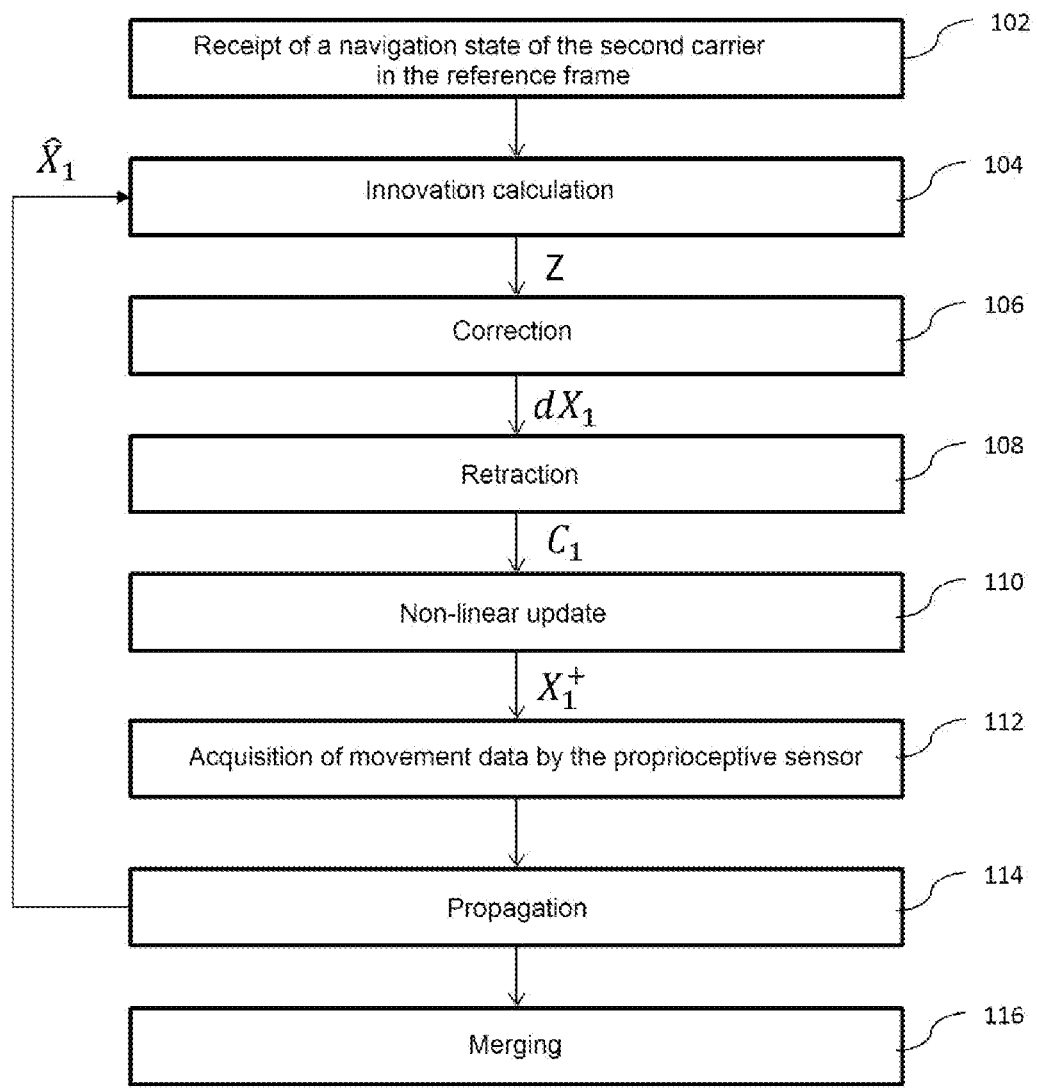
FIG. 3 is a flowchart of steps of a navigation assistance method, according to one embodiment of the invention.

Referring to FIG. 3, a method for assisting the navigation of the first carrier 1 according to one embodiment, and implementing an invariant Kalman filter configured as indicated in section 2/, comprises the following steps.

It is assumed that an estimation $\hat{X}_1$ of the navigation state of the first carrier 1 has been estimated by the invariant Kalman fitter.

It is furthermore assumed that the second carrier has estimated a navigation state $X_2$ of this second carrier in the reference frame, using its internal means 12. This navigation state $X_2$ comprises the rigid transformation $T_2$ formed by the pair $(R_2, x_2)$.

In a step 102, the communication interface 4 of the first carrier 1 receives from the communication interface 14 of the second carrier 2 the data representative of the rigid transformation $T_2$. These data are then transmitted to the processing unit 10.

In a step 104, the processing unit 10 calculates the innovation Z of the invariant Kalman fitter, in the following manner $$Z = Z^x = \log(\hat{T}_1^{-1} \circ Y \circ \hat{T}_{21})$$

where:
- Y designates the observation data used by the invariant Kalman filter, which, as recalled, correspond to $T_2$)

○ designates the composition operator of the rigid transformations, log( ) designates a logarithm map within the meaning of the theory of Lie groups, known to those skilled in the art.

This innovation calculation is particularly advantageous because it allows satisfying conditions a. and b. set out in the introduction.

In a correction step 106, the data processing unit 10 multiplies the innovation Z by a matrix K called "gain" matrix, which expresses Z in a linear correction $dX_1=KZ$ to be applied to the state of the system $X_1$.

The choice of the gains is a classic question common to most estimation methods (see below).

In a retraction step 108, the processing unit 10 transforms the linear correction $dX_1$ into a non-linear correction $C_1$ of the same nature as $\hat{X}_1$ (the state $\hat{X}_1$ is not a vector because it contains rotations). The transformation used is any function taking as argument a vector of the dimension of the state $X_1$ (15 in this case) and returning an object of the same nature as $X_1$ but a particularly efficient choice is the term-by-term exponential of the Lie group of the pairs of rigid transformations.

A non-linear update step 110 is then implemented by the processing unit 10. In this step 110, the processing unit 10 combines the estimation $X_1$ of the state of the system with the non-linear correction $C_1$ to build a corrected estimation $$\hat{X}_1^+ = \hat{X}_1 * C_1$$

The gain matrix K is chosen so as to stabilize the non-linear estimation error e defined by:

$$e = X_1^{-1} * \hat{X}_1$$

where the symbol $.^{-1}$ is the usual inversion associated with the binary operation *. In this embodiment, invariance to the left of the estimation error e is obtained. It can of course be envisaged to modify the preceding equations to obtain right invariance (the left invariance being however a preferred embodiment).

In an acquisition step 112, the proprioceptive sensor 3 furthermore acquires movement data of the first carrier 1 in the first frame. These movement data typically comprise accelerations and/or velocities, for example angular velocities. These acquired movement data are transmitted to the processing unit 10.

Step 112 can be implemented before, during, or after any one of steps 102, 104, 106, 108, 110.

In a propagation step 114, known per se to those skilled in the art, the processing unit 10 generates a propagated navigation state, from the state $X_1^+$. To do so, the processing unit 10 applies, in a manner known per se, an evolution model derived from an integration of the data acquired by the proprioceptive sensor 6.

The steps described above form an iteration of the invariant Kalman filter.

Thanks to the invariant Kalman filter, a property that would also be obtained in a linear case, is obtained: the evolution of the estimation error is autonomous (it depends neither on $X_1$ nor on $\hat{X}_1$).

The navigation state emission of the second carrier is repeated over time, such that these states are received by the first carrier 1.

The processing unit 10 repeats these same steps, 104, 106, 108, 110, 112, 114 in new iterations of the invariant Kalman filter, for each new state of the second carrier received. The state estimated during the propagation step 112 of a given iteration is used as input data for the innovation calculation 104 and non-linear update 110 steps of a following iteration.

Ultimately, thanks to the method, the first carrier 1 can obtain assistance on its own navigation using the data already available in the second carrier 2 on its own navigation.

Several Kalman filters are advantageously implemented in parallel by the processing unit 10, so as to obtain several estimates of the navigation state of the first carrier 1.

It should be noted that some processing operations can be carried out only once for all the Kalman filters concerned. In particular, one of these processing operations is the resolution of a Ricatti equation known to those skilled in the art.

In this case, the processing unit determines, for each estimate, a data deviation metric of the estimate.

This metric L is for example written:

$$L = Z^T S^{-1} Z$$

Where S is the covariance of the innovation Z as conventionally calculated in the step of updating a conventional Kalman filter.

The metric L can be calculated for a given measurement. As a variant, the metric L is the sum of the values obtained on a set of the past measurements.

In a merging step 116, the processing unit 10 produces a consolidated estimate of the navigation state of the first carrier based on the estimates and their associated likelihood metrics L.

In one embodiment, the estimate obtained by one of the filters which has the metric that reflects the smallest data deviation is selected as consolidated estimate.

In another embodiment, the consolidated estimate is an average of the estimates determined by the different filters, which is weighted by the metrics.

The estimated states $X_1$ not being vectorial in nature, those skilled in the art can use an average adapted to the case of the varieties.

In other variants, it is possible to complete the estimated state $X_1$ with other interesting variables, for example an error state specific to the proprioceptive sensor (bias, scale factor, drift, etc.).

In this case, the binary operation * is additive for the proprioceptive sensor error state.

Let B the proprioceptive sensor error state considered.

The binary operation then becomes:

$$(R_1, v_1, x_1, R_{21}, x_{21}, B) * (R'_1, v'_1, x'_1, R'_{21}, x'_{21}, B') = (R_1 R'_1, v_1 + R_1 v'_1, x_1 + R_1 x'_1, R_{21} R'_{21}, x_{21} + R_{21} x'_{21}, B + B')$$

Moreover, as already indicated above, the matrix $R_{21}$ can be replaced by a matrix $R_{12}$ which allows switching from the second frame (attached to the second carrier 2) to the first frame (attached to the first carrier 1). Likewise, the vector $x_{21}$ can be replaced by a vector $x_{12}$, which is a translation vector allowing switching from the coordinates of a point in the second frame to the coordinates of the same point in the first frame.

$T_{12} = (R_{12}, x_{12}) = T_{21}^{-1}$ is further written out.

In this case, the binary operation, expressed in the new variables, becomes:

$$(R_1, v_1, x_1, R_{12}, x_{12}) * (R'_1, v'_1, x'_1, R'_{12}, x'_{12}) = (R_1 R'_1, v_1 + R_1 v'_1, x_1 + R_1 x'_1, R'_{12} R_{12}, x'_{12} + R'_{12} x_{12})$$

In this case, the innovation Z becomes:

$$Z = \log(\hat{T}_1^{-1} \circ Y \circ \hat{T}_{12}^{-1})$$

In another embodiment, the proprioceptive measurements of the carrier 1 comprise an angular velocity ω. In addition, the navigation state $X_2$ of the second carrier 2 received includes a velocity vector of the second carrier 2 in the reference frame and a rotation matrix representing an attitude of the second carrier in the reference frame. The invariant Kalman fitter then uses an innovation Z with the form:

$$Z=Z^v=\log((\hat{R}_1^T R_2 \hat{R}_{21}, \hat{R}_1^T(v_2-\hat{v}_1)+\hat{R}_1^T R_2(\omega \times \hat{x}_{21})))$$

where:

$\hat{R}_1$ is an estimate of the rotation matrix $R_1$ contained in the rigid transformation $T_1$. More specifically, $R_1$ is such that the coordinates $u \in \mathbb{R}^3$ of a point in the frame attached to the carrier 1 become $R_1 u + x_1$ in the reference frame, where $x_1$ is the position of the first carrier in the reference frame.

$\hat{R}_{21}$ and $\hat{x}_{21}$ are the estimates of the rotation matrix $R_{21}$ and of the translation vector $x_{21}$ defining the rigid transformation $T_{21}=(R_{21}, x_{21})$. More specifically, $R_{21}$ and $x_{21}$ are such that the coordinates $u \in \mathbb{R}^3$ of a point in the frame attached to the carrier 1 become $R_{21} u + x_{21}$ in the frame attached to the carrier 2, $R_2$ is the rotation matrix representing the attitude of the carrier 2 (available as an observation, as indicated above). More specifically, $R_2$ is such that the coordinates $u \in \mathbb{R}^3$ of a point in the frame attached to the carrier 2 become $R_2 u + x_2$ in the reference frame, where $x_2$ is the position of the carrier 2 in the reference frame (which does not need to be observed for this claim).

$v_2$ is the velocity of the carrier 2 in the reference frame (available as an observation)

$\hat{v}_1$ is the estimated velocity of the carrier 1 in the reference frame.

× designates the conventional vector product log(•) designates the logarithm function (reciprocal of the exponential function) of the Lie group SE(3). It should be noted that the object passed as input of the log function is an object belonging to the Lie group SE(3) and being written as a pair consisting of a rotation matrix and a size vector 3.

This other embodiment allows closely approximating the conditions a. and b. set out in the introduction, and satisfying them only under the assumption that the second carrier is "flat", that is to say under the assumption that the angular velocity measurements ω are always on the same axis, and that this axis is also the axis of rotation $R_{21}$. This assumption is verified particularly if all the rotations considered ($R_1$ and $R_2$) have a vertical axis, as it is generally the case on a land vehicle. This is why the embodiment in which $Z=Z^x$ is more advantageous.

The vector $Z^v$ consists of a first vector $Z_R^v$ of size 3 representative of a rotation, and a second vector $Z_v^v$ of size 3 as well.

It can also be envisaged, in another embodiment, to combine the data described above to form a more complex innovation Z with the following form:

$$Z = \begin{pmatrix} Z^x \\ Z_v^v \end{pmatrix}$$

The invention claimed is:

1. A method for assisting the navigation of a first carrier stationary relative to a second carrier itself movable in a reference frame, the method comprising the following steps implemented by the first carrier:
  receiving a navigation state in the reference frame of the second carrier provided by the second carrier,
  acquiring movement data of the first carrier by at least one proprioceptive sensor of the first carrier, and
  estimating a navigation state of the first carrier by an invariant Kalman filter using the navigation state of the second carrier as observation data,
  wherein the navigation state of the first carrier comprises:
  first variables representative of a first rigid transformation linking a frame attached to the first carrier to the reference frame, and
  second variables representative of a second rigid transformation linking a frame attached to the second carrier to the frame attached to the first carrier, and
  wherein the invariant Kalman filter uses binary operation, and the operation comprises a term-by-term composition of the first rigid transformation and of the second rigid transformation.

2. The method according to claim 1, wherein the first variables comprise a rotation matrix representing an attitude of the first carrier, and the second variables comprise a rotation matrix representing an attitude of the second carrier relative to the first carrier.

3. The method according to claim 1, wherein the first variables comprise a first position vector representing a position of the first carrier, and the second variables comprise a second position vector representing a position of the second carrier relative to the first carrier.

4. The method according to claim 1, wherein the estimated navigation state of the first carrier further comprises a velocity vector representing a velocity of the first carrier in the reference frame.

5. The method according to claim 4, wherein the first variables comprise a first position vector representing a position of the first carrier, and the second variables comprise a second position vector representing a position of the second carrier relative to the first carrier, and wherein the binary operation applies identical transformations to the velocity vector and to one of the first position vector and the second position vector.

6. The method according to claim 1, wherein the navigation state of the second carrier further comprises a position vector representing a position of the second carrier in the reference frame and a rotation matrix representing an attitude of the second carrier in the reference frame.

7. The method according to claim 1, wherein the invariant Kalman filter uses an innovation comprising a vector $Z^x$ with the form:

$$Z^x = \log(\hat{T}_1^{-1} \circ Y \circ \hat{T}_{21})$$

where:

$\hat{T}_1$ is an estimate of the first variables, $\hat{T}_{21}$ is an estimate of the second variables, wherein the second rigid transformation is a transformation from the frame attached to the first carrier to the frame attached to the second carrier, Y designates the observation data used by the invariant Kalman filter, ○ designates a composition, and log(•) designates a logarithm map of a Lie group.

8. The method according to claim 1, wherein the navigation state of the second carrier further comprises a velocity vector representing a velocity of the second carrier in the reference frame and a rotation matrix representing an attitude of the second carrier in the reference frame, and wherein the movement data of the first carrier, acquired by the at least one proprioceptive sensor, further comprises an angular velocity of the first carrier.

9. The method according to claim 8, wherein the first variables comprise a rotation matrix representing an attitude of the first carrier, and the second variables comprise a rotation matrix representing the attitude of the second carrier relative to the first carrier, and wherein the invariant Kalman filter uses an innovation comprising a vector $Z^v$ with the form:

$$Z^v = \log((\hat{R}_1^T R_2 \hat{R}_{21}, \hat{R}_1^T(v_2 - \hat{v}_1) + \hat{R}_1^T R_2(\omega \times \hat{x}_{21})))$$

where:
- $\hat{R}_1$ is an estimate of the rotation matrix representing an attitude of the first carrier,
- $\hat{R}_{21}$ is an estimate of the rotation matrix representing an attitude of the second carrier relative to the first carrier,
- $\hat{x}_{21}$ is an estimate of a translation vector defining the second rigid transformation,
- $R_2$ is the rotation matrix representing an attitude of the second carrier in the reference frame,
- $v_2$ is the velocity vector of the second carrier in the reference frame,
- $\omega$ is the angular velocity of the first carrier,
- × designates a vector product,
- log(•) designates a logarithm map of the Lie group.

10. The method according to claim 9, wherein the invariant Kalman filter uses an innovation comprising a vector $Z^x$ with the form:

$$Z^x = \log(\hat{T}_1^{-1} \circ Y \circ \hat{T}_{21})$$

where:
- $\hat{T}_1$ is an estimate of the first variables,
- $\hat{T}_{21}$ is an estimate of the second variables, wherein the second rigid transformation is a transformation from the frame attached to the first carrier to the frame attached to the second carrier,
- Y designates the observation data used by the invariant Kalman filter,
- ○ designates a composition,
- log(•) designates a logarithm map of a Lie group, and wherein the vector $Z^v$ consists of a first vector $Z_R^v$ of size 3 representative of a rotation of the first carrier and the second carrier and of a second vector $Z_v^v$ of size 3 representative of a rotation of the first carrier and the second carrier as well, and wherein the invariant Kalman filter uses an innovation Z with the form:

$$Z = \begin{pmatrix} Z^x \\ Z_v^v \end{pmatrix}$$

11. The method according to claim 1, wherein the navigation state of the first carrier further comprises at least one error state of the at least one proprioceptive sensor, and wherein the binary operation is additive for the at least one error variable of the at least one proprioceptive sensor.

12. The method according to claim 1, wherein the first carrier is an aircraft and the second carrier is an aircraft carrier.

13. The method according to claim 1, wherein the first carrier is a projectile and the second carrier is an aircraft that carries the projectile.

14. The method according to claim 1, wherein the first carrier is an inertial unit of a vehicle and the second carrier is an exteroceptive sensor of the vehicle.

15. The method according to claim 1, wherein estimating the navigation state of the first carrier is implemented in parallel by several invariant Kalman filters, so as to obtain several estimates of the navigation state of the first carrier, and wherein the method further comprises:
- for each estimate, determining a likelihood metric of the estimate,
- producing a consolidated estimate of the navigation state of the first carrier based on each estimate and each likelihood metric.

16. A device for assisting the navigation of a first carrier stationary relative to a second carrier itself movable in a reference frame, the device comprising:
- at least one proprioceptive sensor configured to acquire movement data of the first carrier,
- a communication interface for receiving a navigation state of the second carrier provided by the second carrier, and
- an invariant Kalman filter configured to estimate a navigation state of the first carrier by using the navigation state of the second carrier as observation data, wherein the navigation state comprises:
- first variables representative of a first rigid transformation linking a frame attached to the first carrier to the reference frame, and
- second variables representative of a second rigid transformation linking a frame attached to the second carrier to the frame attached to the first carrier, and wherein the invariant Kalman filter uses a binary operation, and the operation comprises a term-by-term composition of the first rigid transformation and of the second rigid transformation.

17. A device for assisting the navigation of a first carrier stationary relative to a second carrier itself movable in a reference frame, the device comprising:
- at least one proprioceptive sensor configured to acquire movement data of the first carrier,
- at least one antenna configured to receive a navigation state of the second carrier provided by the second carrier,
- an invariant Kalman filter configured to estimate a navigation state of the first carrier by using the navigation state of the second carrier as observation data, wherein the navigation state comprises:
- first variables representative of a first rigid transformation linking a frame attached to the first carrier to the reference frame, and
- second variables representative of a second rigid transformation linking a frame attached to the second carrier to the frame attached to the first carrier, and wherein the invariant Kalman filter uses a binary operation, and the operation comprises a term-by-term composition of the first rigid transformation and of the second rigid transformation.

\* \* \* \* \*